(12) United States Patent
Takauchi et al.

(10) Patent No.: US 8,591,822 B2
(45) Date of Patent: Nov. 26, 2013

(54) OZONE GENERATING APPARATUS

(75) Inventors: Daisuke Takauchi, Tokyo (JP); Yoshiaki Odai, Tokyo (JP); Masayuki Endo, Okayama (JP); Hajime Nakatani, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 490 days.

(21) Appl. No.: 12/690,583

(22) Filed: Jan. 20, 2010

(65) Prior Publication Data

US 2010/0296981 A1 Nov. 25, 2010

(30) Foreign Application Priority Data

May 19, 2009 (JP) ................................. 2009-121056

(51) Int. Cl.
*B01J 19/08* (2006.01)

(52) U.S. Cl.
USPC ................. 422/186.07; 422/186.18; 422/907; 204/176

(58) Field of Classification Search
USPC .................. 422/186.07, 186.18, 907; 204/176
See application file for complete search history.

(56) References Cited

U.S. PATENT DOCUMENTS

| | | | |
|---|---|---|---|
| 3,214,364 A * | 10/1965 | Van Tuyle et al. | 422/186.19 |
| 4,232,229 A * | 11/1980 | Tanaka et al. | 422/186.2 |
| 6,093,289 A * | 7/2000 | Kuzumoto et al. | 204/176 |
| 6,264,897 B1 | 7/2001 | Ishioka et al. | |
| 2004/0140195 A1 | 7/2004 | Billing et al. | |
| 2004/0241057 A1* | 12/2004 | Goodley et al. | 422/186.07 |

FOREIGN PATENT DOCUMENTS

| | | |
|---|---|---|
| JP | 54-011894 | 1/1979 |
| JP | 55-155841 U | 11/1980 |
| JP | 63-025203 A | 2/1988 |
| JP | 7-081904 A | 3/1995 |
| JP | 08-245203 | 9/1996 |
| JP | 10-338503 A | 12/1998 |
| JP | 2000-226203 | 8/2000 |

OTHER PUBLICATIONS

Office Action dated Oct. 21, 2011, issued in the corresponding Canadian Patent Application No. 2,699,771.

* cited by examiner

*Primary Examiner* — Xiuyu Tai
(74) *Attorney, Agent, or Firm* — Buchanan Ingersoll & Rooney PC

(57) ABSTRACT

An ozone generating apparatus for making a temperature distribution in a dielectric tube more uniform including a sealed vessel, two tube sheets made of a conductive metal plate having a hole formed therein which are provided at a predetermined interval to divide the inside of the sealed vessel into three spaces; a metal tube formed so as to connect holes of the tow tube sheets, a dielectric tube which is inserted into the inner part of a dielectric tube so as to have a predetermined gap between an outer wall an inner wall of a metal tube and a metal electrode formed inside the dielectric tube. An alternating current voltage is applied between the tube and electrode, a gas including oxygen flowing in a gap is discharged to generate ozone, and a discharge suppressing member is provided at a part of the gap facing a tube sheet.

3 Claims, 11 Drawing Sheets

OZONE GENERATING APPARATUS

BACKGROUND OF THE INVENTION

1. Field of the Invention

This invention relates to an ozone generating apparatus by utilizing silent discharge.

2. Description of the Related Art

Conventionally, many of ozone generating apparatuses used for water processing utilize silent discharge. The basic configuration of an ozone generating apparatuses utilizing silent discharge comprises a cylindrical dielectric tube having a metal film formed on an inner wall and a cylindrical metal tube, wherein the cylindrical dielectric tube is inserted into the cylindrical metal tube so as to have a predetermined gap between the inner wall of the metal tube and the outer wall of the dielectric tube. A raw material gas including oxygen such as air or oxygen gas is flowed in the gap, high alternating voltage is applied between the metal tube and the metal film, and an alternating current electric field is generated in the gap through the dielectric forming the dielectric tube. Accordingly, the raw material gas is discharged so as to generate ozone by ozonizing oxygen included in the raw material gas. In the ozone generating apparatuses having the above-mentioned configuration, various contrives are made such as providing an insulator in the vicinity of the end of a dielectric tube so as to prevent creeping discharge in the vicinity of the end of a dielectric tube and direct discharge between metals. (For example, Japanese Patent Application Laid Open No. 63-25203, Japanese Patent Application Laid Open No. 7-81904 and Japanese Patent Application Laid Open No. 10-338503).

Regarding ozone generating apparatuses used for processing large amount of water, following the increase of processing amount in recent years, it has been required for the apparatuses to increase processing amount without increasing the size of the apparatuses. In order to satisfy the above-mentioned requirement, it is necessary to increase the discharge power density so as to increase the amount of ozone generated per apparatus size. However, thermal troubles have been increased in response to an increase of discharge power density.

SUMMARY OF THE INVENTION

Thermal troubles have been generated by various causes such as non-uniformity of cooling and non-uniformity of input electric power, that is, non-uniformity of discharge. In conventional ozone generating apparatuses having a small discharge power density, there have been not any serious thermal troubles.

Based on keen examination, inventors of the present invention found out such that thermal troubles have been caused by non-uniformity of cooling in a dielectric tube facing the vicinity of the end of a metal tube.

The present invention has been made so as to solve the problem regarding the non-uniformity of cooling in a dielectric tube facing the vicinity of the end of a metal tube which was found out by inventors of the present invention for the first time. In conventional ozone generating apparatuses, the temperature of a dielectric tube facing the vicinity of the end of a metal tube is higher than that of other parts of the dielectric tube. Therefore, the upper limit of the discharge power density is determined by the temperature of the part of the dielectric tube facing the vicinity of the end of a metal tube. The present invention aims to provide an ozone generating apparatus in which the temperature distribution in a dielectric tube is more uniform than that of conventional ozone generating apparatuses and a discharge power density as a whole can be increased, and whose size can be miniaturized or whose capacity can be increased.

An ozone generating apparatus according to the present invention comprises a sealed vessel; two tube sheets made of conductive metal plate having a hole formed therein which are provided at a predetermined interval to divide the inside of the sealed vessel into three spaces; a metal tube formed as to connect holes of the two tube sheets; a dielectric tube having a metal electrode formed inside thereof and which is held in the metal tube by using a spacer so as to have a predetermined gap between the outer wall of dielectric tube and the inner wall of the metal tube; and an alternating high-voltage power supply for applying an alternating high-voltage between the metal tube and the metal electrode. In the ozone generating apparatus having the above-mentioned configuration, a raw material gas including oxygen is flowed from one space to another space of the three spaces in which the one space is present at one side and the another space is present at another side of the sealed vessel, through at least the above-mentioned gap, ozone is generated by discharging the raw material gas flowing through the above-mentioned gap, using the metal electrode in the dielectric tube as a high electric potential and using the metal tube and the tube sheet as a ground potential, and cooling is carried out by allowing cooling water to flow into the space divided by the two tube sheets, the outer wall of metal tube and the inner wall of sealed vessel; and a discharging suppressing member is provided at the above-mentioned gap facing the tube sheet.

According to the present invention, the amount of a discharge power supplied in a part of the gap facing the tube sheet can be reduced by providing the discharging suppressing member in the part of the gap facing the tube sheet. Consequently, the temperature rise in a part of the dielectric tube facing the tube sheet can be made to be smaller than that of conventional apparatus so as to make the temperature distribution in the dielectric tube more uniform. As a result, the discharge power density can be increased as a whole so as to provide an ozone generating apparatus whose size is miniaturized or whose capacity is increased.

DESCRIPTION OF THE PREFERRED EMBODIMENTS

First Embodiment

Figure 1:
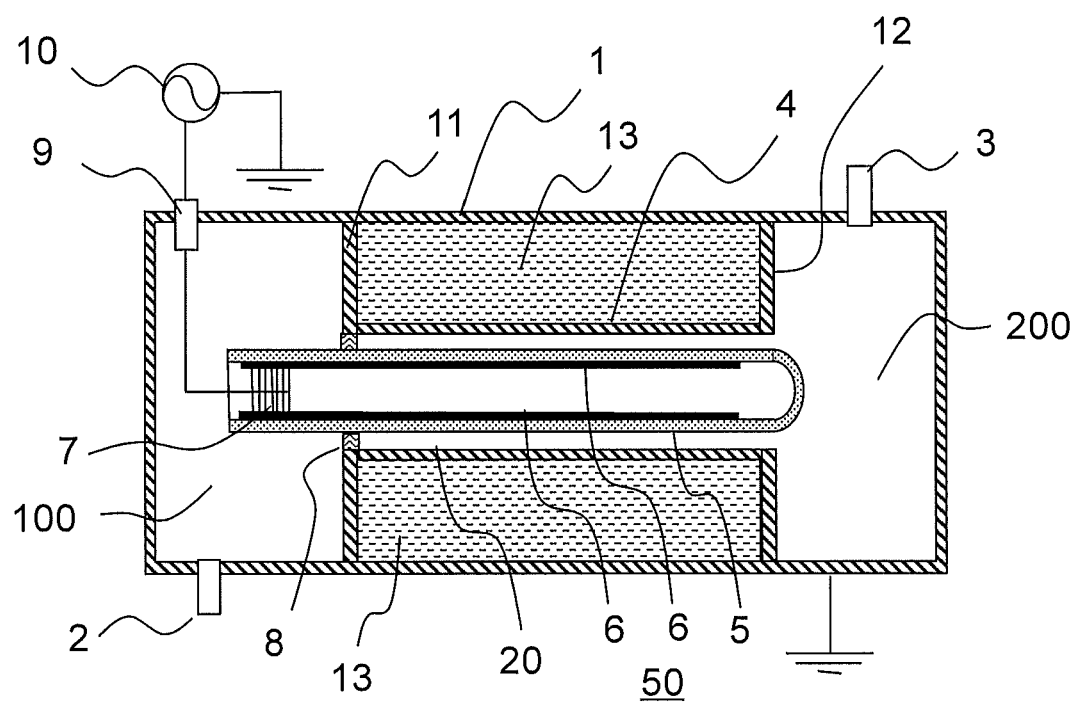
FIG. 1 is a side cross sectional view showing the outline configuration of an ozone generating apparatus according to first embodiment of the present invention.
Figure 2:
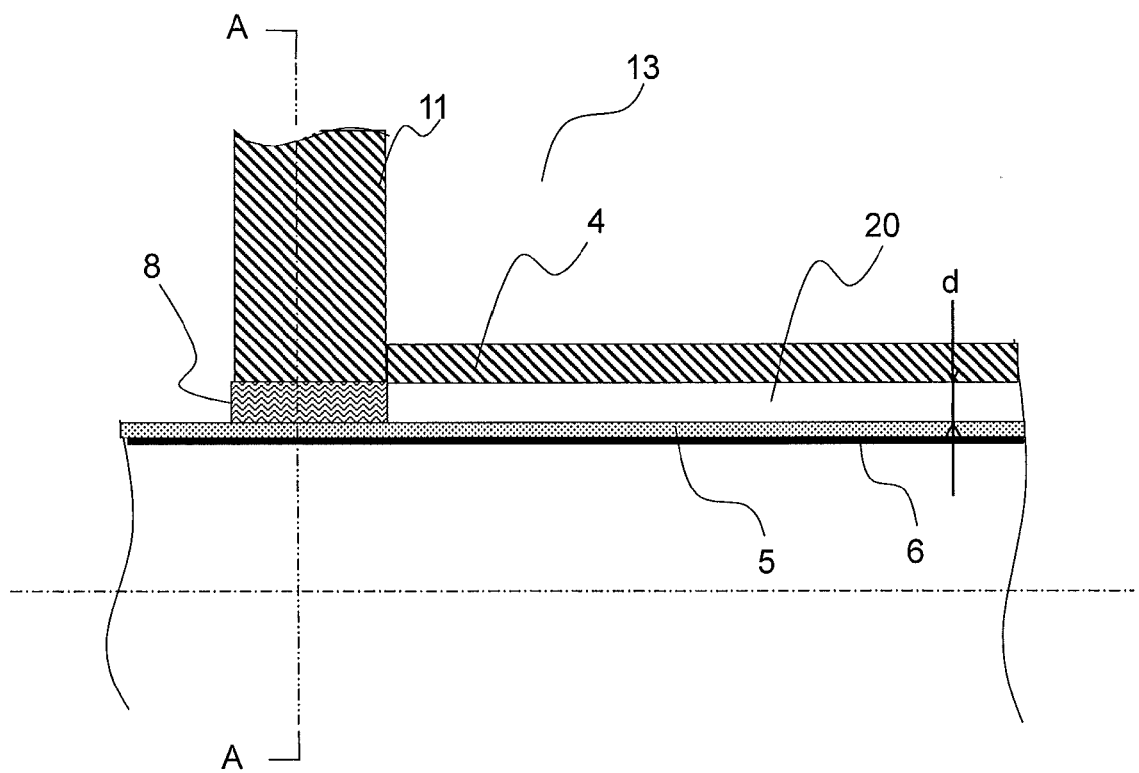
FIG. 2 is an enlarged cross sectional view of a main part of an ozone generating apparatus according to first embodiment of the present invention.
Figure 3A:
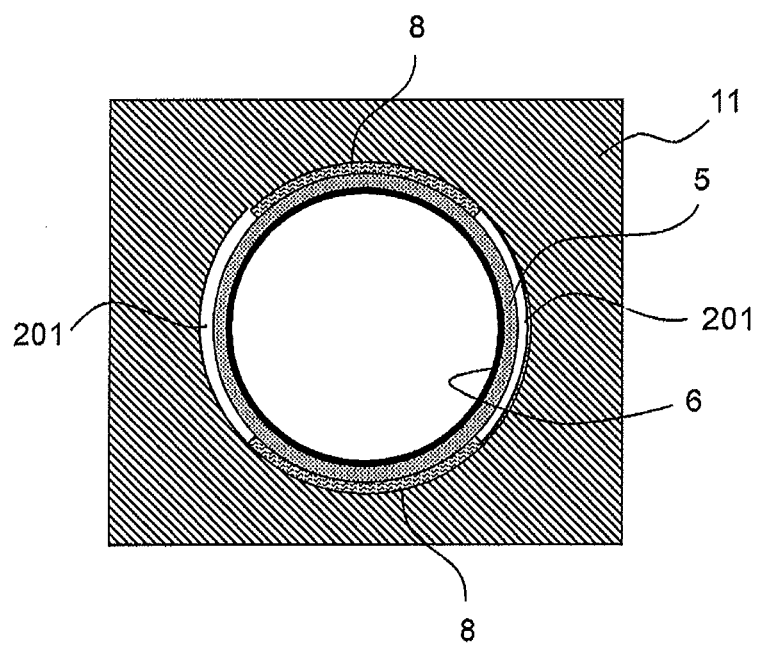
FIG. 3A is an enlarged cross sectional view of a main part of an ozone generating apparatus according to first embodiment of the present invention taken along the line A-A of FIG. 2

Hereinafter, first embodiment will be described referring to FIG. 1, FIG. 2 and FIG. 3A, B. FIG. 1 is a side cross sectional view showing the outline configuration of an ozone generating apparatus according to first embodiment. FIG. 2 is an enlarged sectional view showing a main part of the present invention. FIG. 3 A is a sectional view taken along the line A-A in FIG. 2. FIG. 3 B is a schematic view of a dielectric tube to which a discharge suppressing member is stuck, which will be described later, viewed from the above of the FIG. 3A. Further, FIG. 2 shows the vicinity of a part facing a tube sheet 11, only one side with respect to a central axis of a metal tube 4 and a dielectric tube 5.

In FIG. 1, the numeral 1 indicates a cylindrical sealed vessel, the numeral 2 indicates a raw material gas inlet port, the numeral 3 indicates an ozonized gas outlet port, the numeral 11 indicates a first tube sheet which forms a space 100 at a side of the raw material gas inlet port 2, the numeral 12 indicates a second tube pate which forms a space 200 at a side of the ozonized gas outlet port 3, and the numeral 4 indicates a metal tube. The metal tube 4 is fixed and coupled to a hole provided at the first tube sheet 11 and a hole provided at the second tube sheet 12 so as to keep air-tightness and is used as a grounded electrode. The metal tube 4 is normally cylindrical; however, the sectional shape of the metal tube 4 is not necessarily circular. Further, these two tube sheets 11 and 12 are electrical conductive metal plates, and are at the same electric potential as that of the metal tube 4. The numeral 13 indicates a space divided by the first tube sheet 11, the second tube sheet 12, an outer wall of the metal tube 4 and an inner wall of the sealed vessel 1. The space 13 is filled with cooling water and the cooling water flows therein. The numeral 5 indicates a dielectric tube provided coaxially with the axis of the metal tube 4, the numeral 6 indicates a metal film formed at inner wall of the dielectric tube 5, the numeral 7 indicates a feed element for feeding an electric power to the metal film 6, the numeral 8 indicates a discharge suppressing member, the numeral 9 indicates a high-voltage insulator, and the numeral 10 indicates an alternating current high-voltage power supply. The metal film 6 acts as a metal electrode so as to discharge power through a dielectric forming the dielectric tube 5. Therefore, hereinafter, the dielectric tube 5 together with the metal film 6 may be indicated as a high voltage electrode 50.

Further, in FIG. 1, one pair consisting of the metal tube 4 and the high voltage electrode 50 in the sealed vessel 1 is shown; however, an ozone generating apparatus with large capacity has the configuration such that a plural pairs consisting of the metal tube 4 and the high voltage electrode 50 in the sealed vessel 1 are provided.

Next, operation of the ozone generating apparatus will be described.

A raw material gas is air or oxygen that is a gas including oxygen as a material for generating ozone, and the raw material gas is supplied from the raw material gas inlet port 2 of the sealed vessel 1. The dielectric tube 5 is formed in a cylindrical shape having an opening end at the side where the raw material gas is supplied and having a closed end at the other side. As shown in FIG. 1, in general, power is supplied to a metal electrode, that is, the metal film 6 from the space 100 at the side of the raw material gas inlet port 2 through an insulator 9 such as high-voltage insulator by electrically contacting the metal film 6 with a feed element 7 for feeding a power. Further, as one side of the dielectric tube 5 is closed, a raw material gas flows through a gap between the dielectric tube 5 and the metal tube 4. A raw material gas is ozonized while flowing through the gap by silent discharge so as to supply to an ozone processing machine (not shown in the figure) through the ozonized gas outlet port 3. As well-known in this technical field, dielectrics forming a dielectric tube 5 include a material having a high specific dielectric constant such as glass, ceramics, quartz, enamel, etc. A gap 20 having predetermined size is formed between the outer wall of the dielectric tube 5 and the inner wall of the metal tube 4. The gap 20 is maintained to be 0.3 mm or less by using proper spacers.

Further, the dielectric tube 5 has the configuration such that a part having the predetermined size is projected from the first tube sheet 11 to the space 100. The metal film 6 is also formed in the inner wall of the above-mentioned part. The projecting size is set at a distance so as not to generate the creeping discharge between the metal film 6 formed at the inner wall of the dielectric tube 5 as a high-electric potential and the tube sheet 11 as a grounded potential along the outer surface of the dielectric tube 5. Further, as the feed element 7 for feeding a power is provided at the outside of the tube sheet 11, that is, at the position in the space 100 at the side of the raw material gas inlet port 2, the metal film 6 is also formed at the inner wall of the dielectric tube 5 facing the tube sheet 11. Accordingly, a raw material gas flowing through a gap facing the tube sheet 11 is also discharged. On the other hand, according to first embodiment of the present invention, as a metal film is not formed at the inner wall of the dielectric tube 5 facing the second tube sheet 12 provided at the side of the ozonized gas outlet port, discharge is not generated in a part of the dielectric tube at which a metal film is not formed.

Figure 3B:
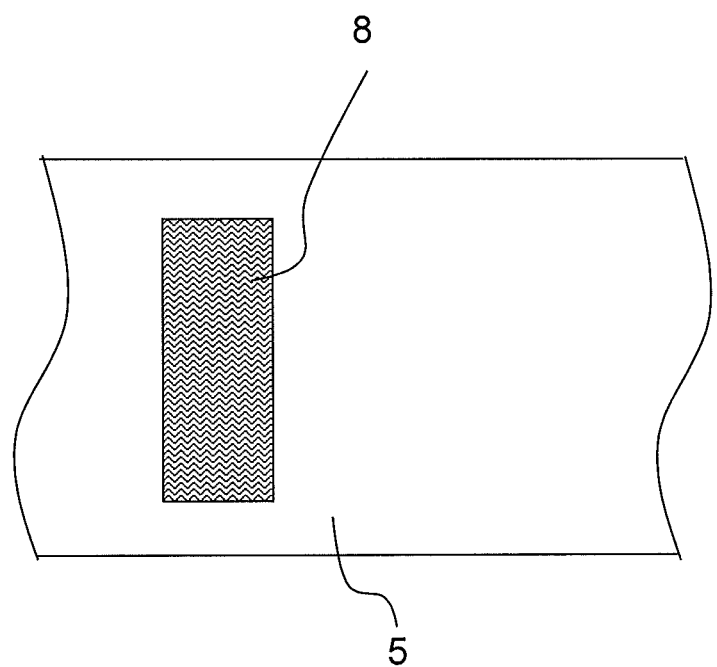
FIG. 3B is a schematic view of a dielectric tube to which a discharge suppressing member in first embodiment of the present invention is stuck, viewed from the above of the FIG. 3A.

In first embodiment of the present invention, the discharge suppressing member 8 is provided at a part of a gap facing the first tube sheet 11 which forms the space 100 at which the raw material gas inlet port 2 is provided (hereinafter, will be referred as the tube sheet 11). FIG. 2 and FIG. 3A, B show the details of cross sectional view of a part at which the discharge suppressing member 8 is provided. As shown in FIG. 3A and FIG. 3B, a thin plate having a rectangular shape and a thickness of a dimension which is almost same as that of the gap indicated by 'd' (regarding d, refer to FIG. 2) made of glass fiber, etc. is stuck along the surface of the dielectric tube 5 with an adhesive. As shown in FIG. 3A, two discharge suppressing members 8 are provided at symmetric positions in the periphery of the dielectric tube 5. A raw material gas can flow through a gap 201, that is, a part of the periphery to which where a discharge suppressing member is not stuck. In an example shown in FIG. 3A, the volume of a discharge suppressing members 8 is made to be about 50% of the volume of a gap formed in the periphery of the dielectric tube facing the tube sheet 11 in a case when a discharge suppressing members 8 is not provided. When the discharge suppressing member 8 is provided in the periphery of the dielectric tube, the volume of the gap will be reduced by the volume of the discharge suppressing member 8, and the volume where discharge can be generated will be reduced. Consequently, in comparison with a case in which a discharge suppressing member is not provided, the discharge power amount per unit length (in the axial direction of the dielectric tube) in a part at which the discharge suppressing member 8 is provided will be reduced.

Further, as shown in FIG. 2, the diameter of holes formed on tube sheets 11 and 12, and the inner diameter of the metal tube 4 are made to be equal, and the tube sheets 11 and the metal tube 4, and the tube sheets 12 and the metal tube 4, are connected by abutting them against each other. However, the diameter of holes formed on the tube sheets 11 and 12, and the outer diameter of the metal tube 4 may be made to be equal so as to connect the tube sheets 11 and 12, and the metal tube 4 by inserting the metal tube 4 into the holes of the tube sheets 11 and 12. Further, a countersunk hole may be formed on the tube sheets 11 and 12, and the metal tube 4 may be partially inserted into the tube sheets 11 and 12. Any method of connecting a metal plate and a metal tube will be acceptable; however, a metal plate and a metal tube should be electrically connected.

Further, in the present invention, "a part facing a tube sheet" refers to a part which is included in an area within the range of extending the width (thickness) of a tube sheet 11. For example, a discharge suppressing member 8 shown in FIG. 2 is provided so as to fill a part of a gap "facing a tube sheet".

Regarding the cooling of the dielectric tube 5, the metal tube 4 is cooled by cooling water flowing along the outer wall of the metal tube 4, gas flowing in the gap 20 is cooled by the metal tube 4, and the dielectric tube 5 is cooled through the gas. A part of the dielectric tube 5 facing the tube sheet 11 is cooled through a gap facing the tube sheet 11 which is contacted with the cooling water, and a part of the dielectric tube 5 facing the tube sheet 11 is located farther from the cooling water than a part of the dielectric tube 5 which is cooled by the metal tube 4 through the gap. Therefore, the cooling ability of the part of the dielectric tube 5 facing the tube sheet 11 is lower than that of the part of the dielectric tube 5 which is cooled by the metal tube 4 through the gap. Consequently, the temperature of the part of the dielectric tube 5 facing the tube sheet 11 rises more quickly than that of other part of the dielectric tube 5. According to first embodiment of the present invention, the discharge suppressing member 8 is provided at a part of the gap 20 facing the tube sheet 11. Therefore, the volume where discharge can be generated will be reduced by the presence of the discharge suppressing member 8, and the discharge power amount per unit length will be reduced. Consequently, even the cooling ability is low; the temperature rise in the dielectric tube 5 facing the tube sheet 11 can be suppressed so as to make the temperature rise in that part same as, or less than that of other part of the dielectric tube 5. In a case where a discharge suppressing member is not provided, the temperature rise of a part of the dielectric tube 5 facing the tube sheet 11 is greater than that of other part. Consequently, only the discharge power which makes the temperature of the dielectric tube lower than the allowable upper limit temperature can be supplied to. On the other hand, in a case where the discharge suppressing member 8 according to first embodiment of the present invention is provided, as the temperature of a part of the dielectric tube 5 facing the tube sheet 11 is the same as or lower than that of other part, the upper limit of discharge power is not limited by the temperature of the part. Consequently, in a case where the high voltage electrode 50 and the metal tube 4 having the same size as that of conventional high voltage electrode and metal tube are used, more electric power can be supplied to an apparatus, and an ozone generating apparatus having larger capacity than that of conventional apparatus can be realized by using an ozone generating apparatus comprising a high voltage electrode and a metal tube having the same size as that of conventional high voltage electrode and metal tube. Further, an ozone generating apparatus which is smaller than that of conventional one and which generates the same amount of ozone can be realized.

Then, insertion amount of the discharge suppressing member 8 will be examined. An objective of providing a discharge suppressing member is to suppress the temperature rise in a part of a dielectric tube facing a tube sheet. Therefore, it is necessary to reduce the discharge power density in the part. In a case where a discharge suppressing member is not provided, discharge is generated over the whole of a gap facing the tube sheet 11 and electric power is supplied to the whole of the gap. On the other hand, in a case where the discharge suppressing member 8 is inserted, gas is not present in a part at which the discharge suppressing member 8 is provided, therefore, discharge is not generated. Consequently, the greater a ratio of the volume of the discharge suppressing member 8 in the volume of the space facing the tube sheet 11 is, the larger a ratio of reducing discharge power is. From this viewpoint, it is desirable that the volume of the discharge suppressing member 8 is greater, and it is desirable that the volume of the discharge suppressing member 8 provided at a part of the dielectric tube 5 facing the tube sheet 11 is 20% or more of the volume of a gap in a case where a discharge suppressing member 8 is not provided. That is, it is desirable that the volume of the gap facing the tube sheet 11 in a case where the discharge suppressing member 8 is provided is reduced by 20% or more of the volume of a gap facing the tube sheet in a case where a discharge suppressing member is not provided by providing the discharge suppressing member 8 at a part of the dielectric tube 5 facing the tube sheet 11. However, it is necessary for the gas to flow through the gap. From this viewpoint, it is desirable that the pressure loss of the discharge suppressing member 8 to the flow of gas is as small as possible. On a cross-sectional surface perpendicular to the axis of the dielectric tube 5, a ratio of the cross-sectional area of the discharge suppressing member 8 in the cross-sectional area of the gap facing the tube sheet 11 can be 80% or less. As above-mentioned, the effect of reducing the discharge power can be obtained and the influences to the flow of the gas can be reduced by making the volume of the discharge suppressing member facing the tube sheet to be 20% or more of the volume of the gap facing the tube sheet in a state where a discharge suppressing member is not provided, and by making a ratio of the cross-sectional area of the discharge suppressing member 8 in the cross-sectional area of a gap facing the tube sheet 11 to be 80% or less on a cross-sectional surface perpendicular to the axis of the dielectric tube 5.

In FIG. 3A, the discharge suppressing member 8 is split into two parts and are arranged symmetrically in the peripheral direction of the dielectric tube 5, however, the dividing number of a discharge suppressing member is not limited to '2' but may be set to be '3', '4' or more. The more parts a discharge suppressing member is divided into, the more uniformly a discharge power is supplied in the peripheral direction of the dielectric tube 5, however, the smaller the sectorial dividing number of a discharge suppressing member is, the more easily an apparatus can be assembled. In this embodiment, a case in which the size of the discharge suppressing member 8 in the axial direction of the dielectric tube 5 is the same as the thickness of the tube sheet 11 is described, but not limited to this, and the size of a discharge suppressing member may be greater than that of the thickness of the tube sheet, that is, a discharge suppressing member may protrude from a part facing the tube sheet 11. In either case, it is necessary for the volume of a part of the discharge suppressing member facing the tube sheet 11 is 20% or more of the volume of a gap in a case where a discharge suppressing member is not provided.

As for a material of the discharge suppressing member 8, not only the above-mentioned glass fiber but also other materials including a fluorine resin such as TEFLON (registered trademark) and a material having excellent insulation property and oxidation resistance such as polyester and acetate may be used, and an adhesive having excellent adhesive force is used. Further, it is desirable that the discharge suppressing member 8 is made of a deformable material. Because, even if there is an error of the outer diameter size of the high voltage electrode 50 or the inner diameter size of the metal tube 4 and the gap 'd' is small, the high voltage electrode 50 can be smoothly inserted into the inner part of the metal tube 4 by deforming the discharge suppressing member 8.

Second Embodiment

Figure 4:
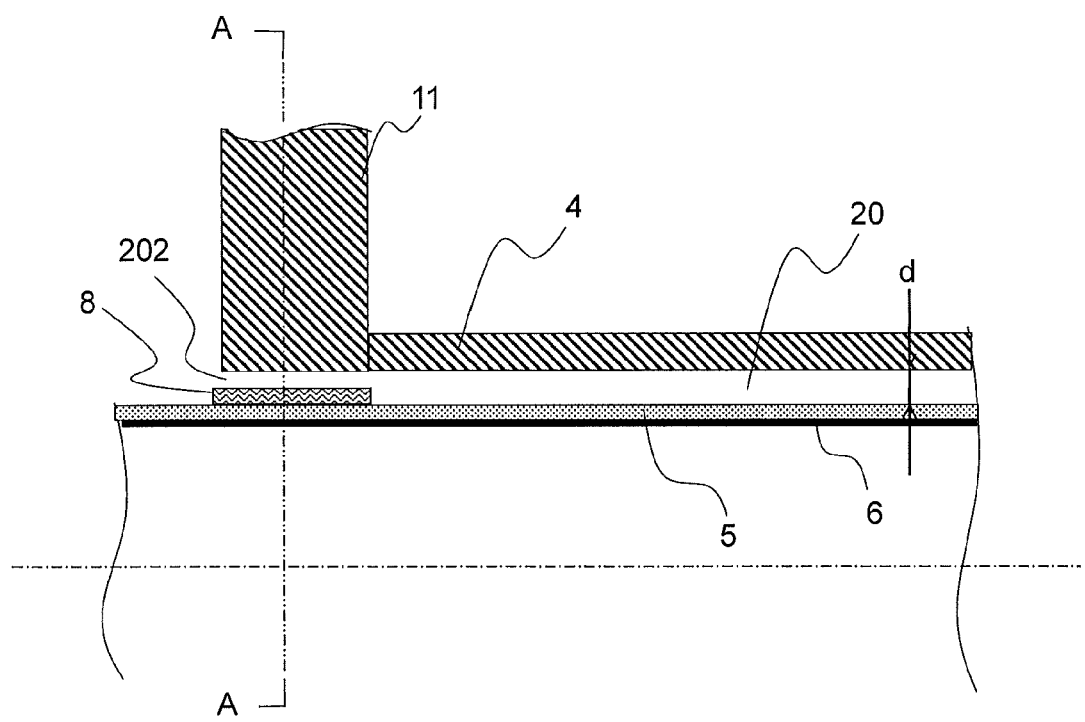
FIG. 4 is an enlarged cross sectional view of a main part of an ozone generating apparatus according to second embodiment of the present invention.
Figure 5:
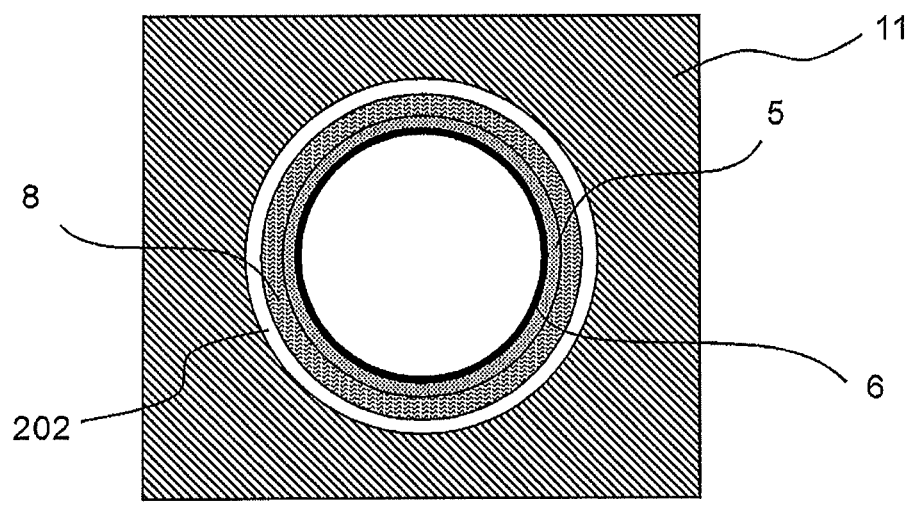
FIG. 5 is an enlarged cross sectional view of a main part of an ozone generating apparatus according to second embodiment of the present invention taken along the line A-A of FIG. 2

FIG. 4 and FIG. 5 show the configuration of second embodiment of the present invention. FIG. 4 is an enlarged sectional view showing a main part in second embodiment, and FIG. 5 is a sectional view taken along the line A-A in FIG. 4. Further, in the same way as that of FIG. 2, FIG. 4 shows the vicinity of a part facing the tube sheet 11 at only one side with respect to a central axis of the metal tube 4 and the dielectric tube 5.

As above-mentioned, in first embodiment, the discharge suppressing members 8 having the thickness which is the almost same as that of the size of gap 'd' of are dispersed and arranged in the peripheral direction of the dielectric tube 5. In second embodiment, as shown in FIG. 5, the discharge suppressing member 8 having a thickness which is thinner than the size of gap 'd' is provided over a whole periphery of the dielectric tube 5.

As for a material used in second embodiment for forming the discharge suppressing member 8 is not limited to an insulating material such as glass fiber, TEFLON (registered trademark), polyester and acetate are as described in first embodiment, but also, a metal material having excellent oxidation resistance which is made by stainless steel or copper applying plating of NI or Zn may be used.

In second embodiment, a part of a gap facing the tube sheet 11 is completely covered with the discharge suppressing member 8 provided over a whole periphery of the dielectric tube 5 so as to form a gap 202 having the narrowed size. In a part having the narrowed size, the discharge power amount per unit length in an axial direction will be reduced in comparison with a case where a discharge suppressing member is not provided, that is, a gap having the size of 'd' is present. Consequently, the temperature rise in a part where the discharge suppressing member 8 is provided, that is, the temperature rise in a part facing the tube sheet 11 can be suppressed.

In second embodiment, in the same way as that of first embodiment, the greater a ratio of the volume of the discharge suppressing member 8 in the volume of the space facing the tube sheet 11 is in a case where a discharge suppressing member is not provided, that is, the thicker the thickness of the discharge suppressing member 8 is, the larger a ratio of reducing the discharge power is. From this viewpoint, it is desirable that the volume of the discharge suppressing member 8 is greater. From this viewpoint, it is desirable that the volume of a discharge suppressing member 8 facing the tube sheet 11 is 20% or more of the volume of the gap in a case where a discharge suppressing member is not provided. That is, it is desirable that the volume of the gap facing the tube sheet is reduced by 20% or more the volume of the gap facing the tube sheet 11 in a case where a discharge suppressing member is not provided by providing the discharge suppressing member 8 at apart of the dielectric tube 5 facing the tube sheet 11. However, it is necessary for the gas to flow through the gap. From this viewpoint, it is desirable that the pressure loss of the discharge suppressing member 8 to the flow of gas is as small as possible. From this viewpoint, a ratio of the cross-sectional area of the discharge suppressing member 8 in the cross-sectional area of a gap facing the tube sheet 11 can be 80% or less. As above-mentioned, the effect of reducing the discharge power can be obtained and the influences to the flow of the gas can be reduced by making the volume of a discharge suppressing member 8 facing the tube sheet 11 to be 20% or more of the volume of the gap facing the tube sheet 11 in a state where a discharge suppressing member is not provided, and by making a ratio of the cross-sectional area of the discharge suppressing member 8 facing the tube sheet 11 to be 80% or less to the area of the gap facing the tube sheet 11.

In second embodiment, in the same way as that of first embodiment, the size, that is, the width of a discharge suppressing member 8 in the axial direction of the dielectric tube 5, may be greater than that of the thickness of the tube sheet 11. That is, the discharge suppressing member 8 may protrude from a part facing the tube sheet 11, on the other hand, the size of the discharge suppressing member 8 may be smaller than the thickness of the tube sheet 11. In either case, it is necessary for the volume of the discharge suppressing member 8 facing the tube sheet 11 is 20% or more of the volume of a gap in a case where a discharge suppressing member is not provided.

Further, the configuration which is constituted by the combination of the configuration of first embodiment and the configuration of second embodiment, that is, the configuration in which a discharge suppressing members having the thickness thinner than that of the size of gap 'd' are dispersed and arranged in the peripheral direction of the dielectric tube 5 is acceptable. In this case, it goes without saying that it is also possible to obtain the effect of reducing the discharge power and the effect of reducing the influence to the flow of the gas by making the volume of the discharge suppressing member facing the tube sheet 11 to be 20% or more of the volume of the gap facing the tube sheet 11 in a state where a discharge suppressing member is not provided, and on a cross-sectional surface perpendicular to the axis of the dielectric tube 5, a ratio of the cross-sectional area of the discharge suppressing member in the cross-sectional area of the gap facing the tube sheet 11 to be 80% or less to the cross-sectional area of the gap facing the tube sheet 11 in a state where a discharge suppressing member is not provided.

Third Embodiment

Figure 6A:
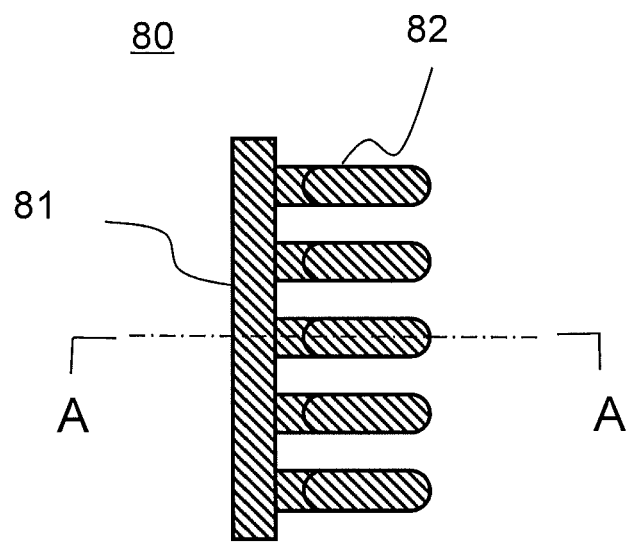
FIG. 6A is a view of a discharge suppressing member in third embodiment of the present invention.
Figure 6B:
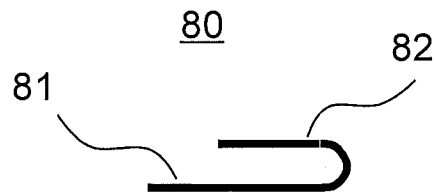
FIG. 6B is a cross sectional view of a discharge suppressing member taken along the line A-A of FIG. 6A.
Figure 7:
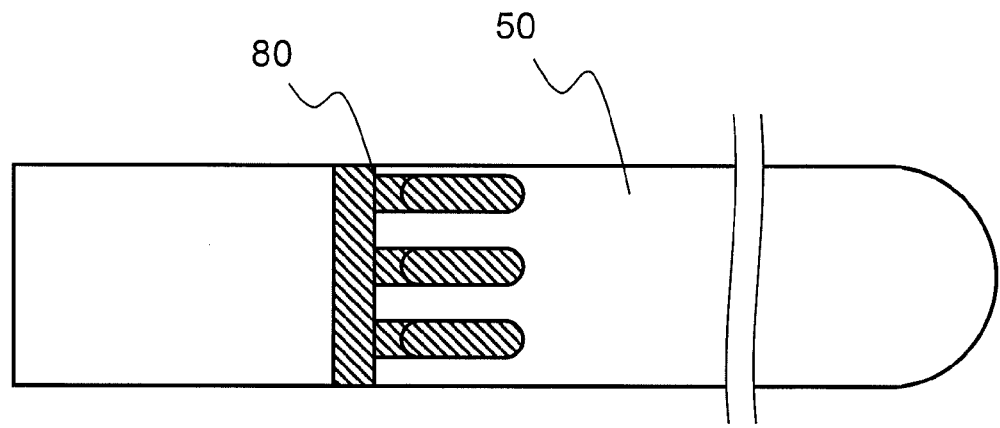
FIG. 7 is a view showing the outline configuration of a dielectric tube to which a discharge suppressing member is stuck in third embodiment of the present invention.
Figure 8:
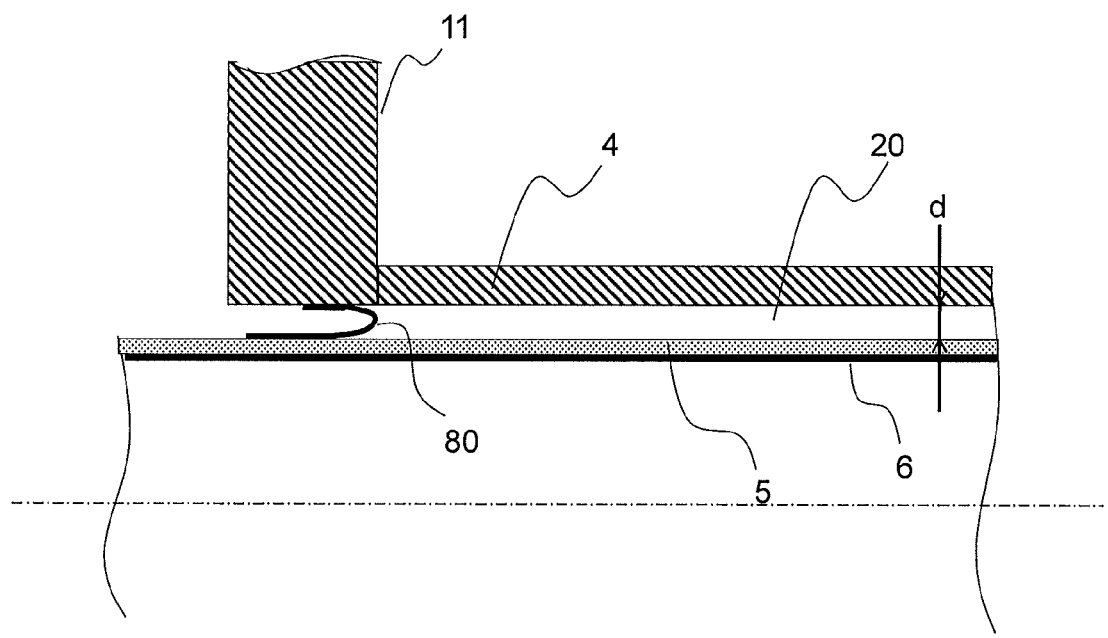
FIG. 8 is an enlarged cross sectional view of a main part of an ozone generating apparatus according to third embodiment of the present invention.

FIG. 6A, B, C, FIG. 7 and FIG. 8 are views showing the configuration of third embodiment of the present invention. FIG. 6A, B, C are views of a discharge suppressing member 80 in third embodiment of the present invention. FIG. 7 is a schematic side view showing the state in which the discharge suppressing member 80 is stuck to the high voltage electrode 50. FIG. 8 is an enlarged sectional view showing the part facing the tube sheet 11 in a case the discharge suppressing member 80 shown in FIG. 6B is provided. Further, in the same way as that of FIG. 2 and FIG. 4, FIG. 8 shows the vicinity of a part facing the tube sheet 11 at only one side with respect to a central axis of the metal tube 4 and the dielectric tube 5.

Figure 6C:
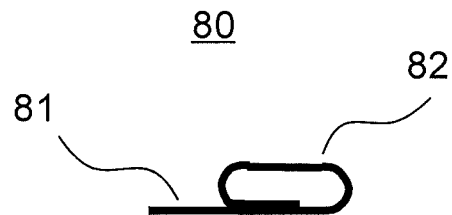
FIG. 6C is a cross sectional view of another discharge suppressing member, in third embodiment of the present invention, taken along the line A-A of FIG. 6A.

In first embodiment, a rectangular-shaped discharge suppressing member 8 made of insulating material is used, however, in third embodiment, as shown in FIG. 6A, the discharge suppressing member 80 has the configuration comprising a rectangular-shaped adhesive part 81 and a contact part 82 made of electrical conductive material such as metal. As for the adhesive part 81, the width is set to be 2 mm to 10 mm, the thickness is set to be 0.02 mm to 0.05 mm and the length is set to be the same as of the length of the periphery of the high voltage electrode 50. As for the contact part 82, the thickness is set to be 0.02 mm to 0.05 mm, the width is set to be 0.5 mm to 3 mm and the length is set to be 8 mm to 15 mm. However, as shown in FIG. 6B and FIG. 6C, that are sectional view taken along the line A-A in FIG. 6A, the length is adjusted to be in a range of 3 mm to 7 mm by bending once or twice. The thickness is adjusted to be in a range of 0.04 mm to 0.20 mm by bending the contact part 82. FIG. 8 shows a case in which d=0.20 mm In third embodiment, the discharge suppressing member 80 is made of metal material. The discharge suppressing member 80 is contacted with the tube sheet 11 or the metal tube 4 so as to be a grounded electric potential. In order for the discharge suppressing member 80 to contact with a metal part, the contact part 82 has the bent structure such that the thickness of the contact part 82 can be adjusted in a range of 0.04 mm to 0.20 mm. Even when the difference between an outer diameter of the dielectric tube 5 and an inner diameter of the metal tube 4 or an inner diameter of a hole in the tube sheet 11 is changed approximately by 0.10 mm, the contact part 82 can be contacted with the inner wall of the metal tube 4 or the inner wall of the hole in the tube sheet 11. Consequently, the discharge suppressing member 80 made of a metal as a whole becomes the grounded electric potential, and in a part of a gap facing the tube sheet 11 where the discharge suppressing member 80 is present, an electric field is not generated. As a result, the discharge is not generated in the part.

Further, the discharge suppressing member 80 has a spring property, and it is desirable that the discharge suppressing member 80 is made of a material having excellent oxidation resistance. For example, a metal such as stainless steel, and a material which is made by applying plating of Ni or Zn on a metal such as stainless steel is used and an adhesive having excellent adhesive force is used.

Further, FIG. 7 is a side view showing the state in which the discharge suppressing member 80 is stuck to the high voltage electrode 50, seen from one side. The discharge suppressing member 80 is provided over the whole periphery of the high voltage electrode 50. As above-mentioned, in third embodiment, an adhesive part 81 is stuck to the whole periphery of the high voltage electrode 50, however, as above-mentioned, the thickness of the adhesive part 81 is in range of 0.02 mm to 0.05 mm. Consequently, a raw material gas can flow through a part where the contact part 82 is not provided. As a result, the pressure loss caused by the discharge suppressing member 80 is so small that the flow of gas is affected slightly.

According to the configuration of the discharge suppressing member as shown in third embodiment, the discharge suppressing member can be used as a spacer keeping the gap between the high voltage electrode 50 and the metal tube 4. The discharge suppressing members may be provided at several positions between the high voltage electrode 50 and the metal tube 4 except for the position facing the tube sheet 11.

As above-mentioned, in third embodiment, the discharge suppressing member 80 made of a metal which is contacted with the tube sheet 11 or the metal tube 4 as a grounded potential is used. Consequently, a discharge is decreased or is not generated in a gap facing the tube sheet 11, and the flow of gas is affected slightly.

Fourth Embodiment

Figure 9:
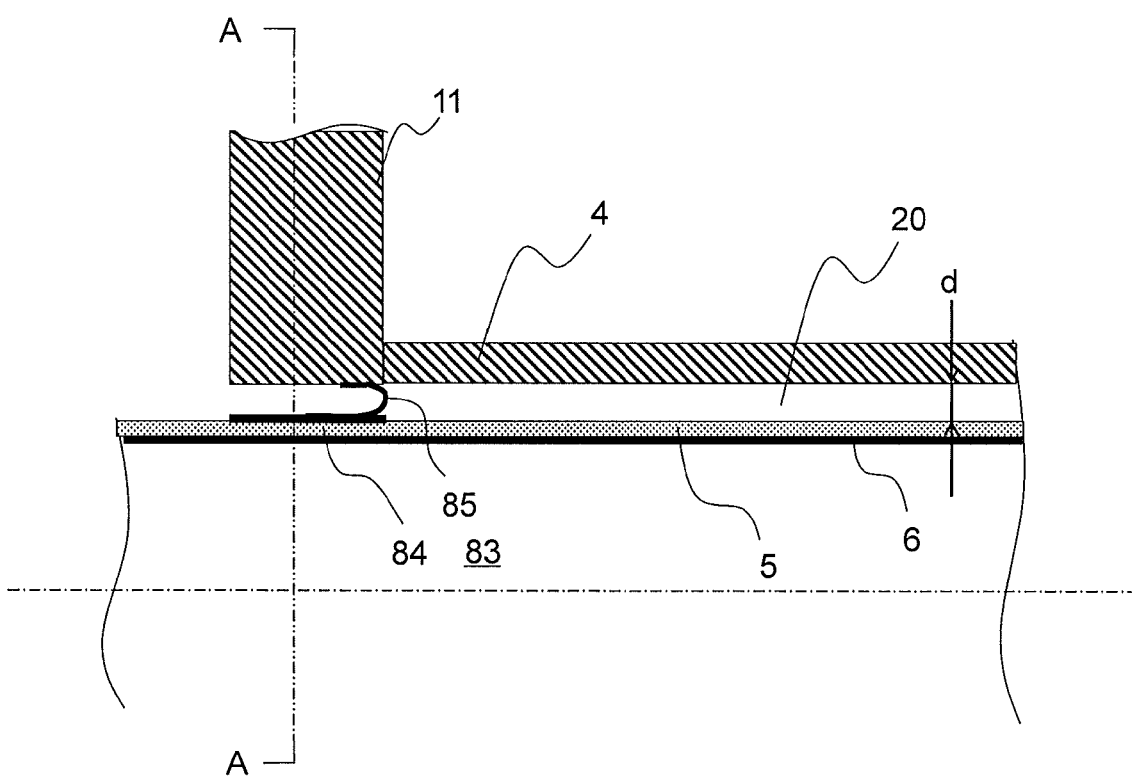
FIG. 9 is an enlarged cross sectional view of a main part of an ozone generating apparatus according to fourth embodiment of the present invention.
Figure 10:
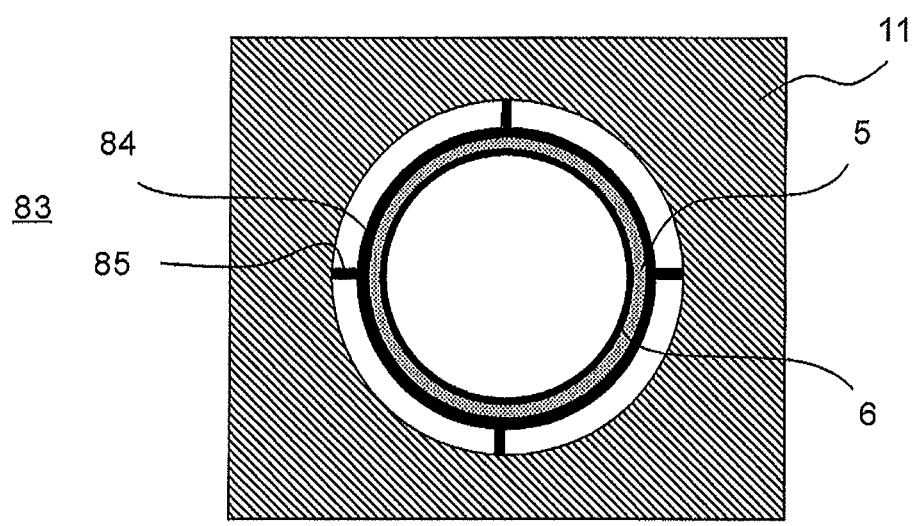
FIG. 10 is an enlarged cross sectional view of a main part of an ozone generating apparatus according to fourth embodiment of the present invention taken along the line A-A of FIG. 9.

FIG. 9 and FIG. 10 are views showing the configuration of an ozone generating apparatus according to fourth embodiment of the present invention. FIG. 9 is an enlarged cross sectional view of a main part of the ozone generating apparatus according to fourth embodiment and FIG. 10 is a cross sectional view taken along the line A-A of FIG. 9. Further, in the same way as that of FIG. 2, FIG. 4 and FIG. 8, FIG. 9 shows the vicinity of a part facing the tube sheet 11 at only one side with respect to a central axis of the metal tube 4 and the dielectric tube 5.

In fourth embodiment, on a surface of the dielectric tube 5 facing the tube sheet 11, a metal material 84 such as a metal film or a metal plate having a predetermined width, for example, having a thickness of the tube sheet 11, is formed or stuck over whole periphery of the surface of the dielectric tube 5, and the metal material 84 is connected to a conductive lead 85 to make a discharge suppressing member 83. The discharge suppressing member 83 is made to be grounded potential by contacting the conductive lead 85 to the tube sheet 11 or to the metal tube 4. An electric field is not generated in a part of a gap facing the tube sheet 11; therefore, a discharge is not generated in the part.

In a case when the metal material 84 is a metal thin film, the metal film is formed by metal plating which is conductive even after being oxidized, such as Ni or Zn. Further, in a case when the metal material 84 is a metal thin plate, the metal thin plate is formed of metal having excellent oxidation resistance such as stainless steel, or a material which is made by applying plating of Ni or Zn on a metal such as copper.

In fourth embodiment, the discharge suppressing member 83 comprises the metal material 84 such as a metal film or a metal plate and a thin conductive lead 85. Consequently, the pressure loss caused by the discharge suppressing member 83 is so small that the flow is affected slightly.

As above-mentioned, in fourth embodiment, the discharge suppressing member 83 made of metal is used. Consequently, a discharge is not generated in a gap facing the tube sheet 11, the temperature rise in a part of a dielectric tube 5 can be suppressed, and the flow of gas is affected slightly.

Fifth Embodiment

Figure 11:
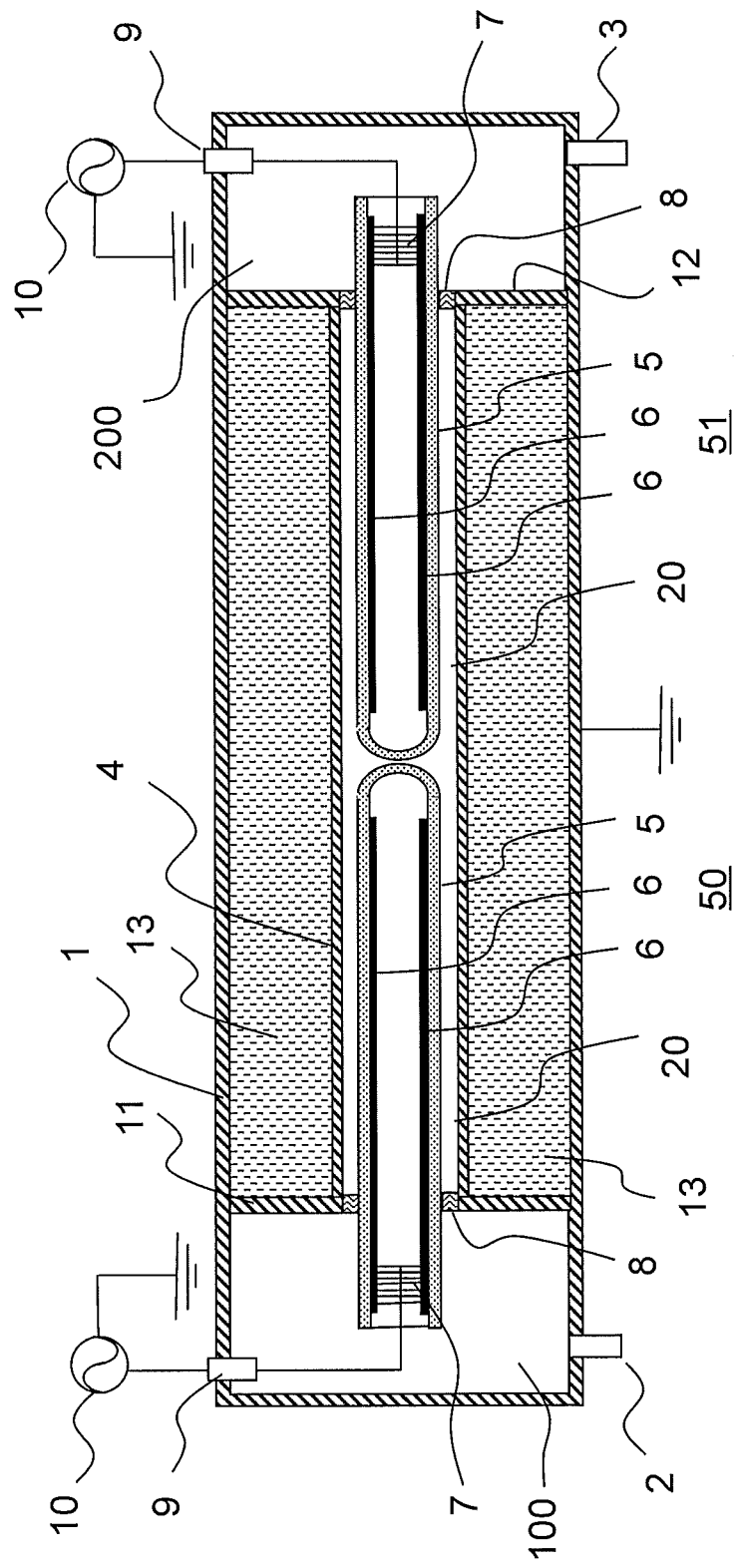
FIG. 11 is a side cross sectional view showing the outline configuration of an ozone generating apparatus according to fifth embodiment of the present invention.

FIG. 11 is a view showing the outline of configuration of an ozone generating apparatus according to fifth embodiment of the present invention. The same reference character as that in FIG. 1 indicates the same part or the counterpart of an ozone generating apparatus. In first embodiment as shown in FIG. 1, a metal film is not formed in the high voltage electrode 50 at a position facing the tube sheet 12 which forms the space 200 at the side of the ozonized gas outlet port 3, and a discharge is not generated in the part of the gap facing the tube sheet 12. Consequently, it is not necessary to provide a discharge suppressing member at the part. However, in an ozone generating apparatus having a large capacity as shown in FIG. 11, two high voltage electrodes (high voltage electrodes 50 and 51) are provided in series, a metal film 6 is formed in the high voltage electrode 51 at a position facing the tube sheet 12 which forms the space 200 at the side of an ozonized gas outlet port so as to generate a discharge in the part of the gap. Consequently, the discharge suppressing member 8 is provided at a part of a gap facing the tube sheet 12 at the side of an ozonized gas outlet so as to decrease the amount of discharge energy. As a result, temperature rise in a part of the dielectric tube 51 facing the tube sheet 12 can be suppressed.

Further, in first embodiment to fifth embodiment, a high voltage electrode made by forming a metal film as a metal electrode at an inner wall of a dielectric tube is used. However, a high voltage electrode may have the configuration such that a conductive such as a metal stick is provided inside a dielectric tube to be a metal electrode, and high voltage is applied between the conductive and a metal tube 4. In this case, discharge is also generated in a gap between the conductive and an inner wall of the dielectric tube. Therefore, a dielectric tube whose both ends are open may be used for a material gas to flow through the gap. Further, a cushioning material, which functions as a spacer to keep the space of the gap, may be inserted into the gap.

As above-mentioned, an ozone generating apparatus according to the present invention comprises a dielectric tube which is held inside of a metal tube so as to keep the predetermined gap between an outer wall of the dielectric tube and an inner wall of the metal tube, a metal electrode provided inside of the dielectric tube, having the configuration in which an alternating high voltage is applied between the metal electrode and the metal tube so as to discharge a material gas including oxygen flowing through at least a part of a gap between the outer wall of the dielectric tube and the inner wall of the metal tube, and the oxygen is ozonized, and wherein a discharge suppressing member provided at a part of a gap facing a tube sheet. According to the above-mentioned configuration, the temperature rise in a part of the dielectric tube facing the tube sheet can be made to be smaller than that of conventional apparatus so as to make the temperature distribution in the dielectric tube more uniform. As a result, the discharge power density can be increased as a whole so as to provide an ozone generating apparatus whose size is miniaturized or whose capacity is increased.

According to first embodiment to fifth embodiment of the present invention, the effect of increasing the power density can be obtained. That is, the effect is especially remarkable at a high discharge power density such as an average power density as a whole part is in a range of 0.2 W/cm² to 0.7 W/cm². According to the present invention, an ozone generating apparatus which can stably operate even in a case when a discharge is generated with such a high discharge power density can be provided.

What is claimed is:

1. An ozone generating apparatus, comprising:
   a sealed vessel;
   two tube sheets made of conductive metal plate having a hole formed therein which are provided at a predetermined interval to divide an inside of the sealed vessel into three spaces;
   a metal tube formed as to connect holes of the two tube sheets;
   a dielectric tube having a metal electrode formed inside thereof and which is held in the metal tube so as to have a predetermined gap between an outer wall of the dielectric tube and an inner wall of the metal tube;
   an alternating current power supply to apply alternating high voltage between the metal tube and the metal electrode, wherein the ozone generating apparatus has a configuration such that a raw material gas including oxygen is flowed from one space to another space of the three spaces in which one space is present at one side and the another space is present at another side of the vessel, through at least the above-mentioned gap, ozone is generated by discharging the raw material gas flowing through the above-mentioned gap, using the metal electrode in the dielectric tube as a high electric potential and using the metal tube and the tube sheet as a grounded potential, and cooling is carried out by allowing cooling water to flow into the space divided by the two tube sheets, the outer wall of metal tube and the inner wall of sealed vessel; and
   at least one discharging suppressing member, being a thin metal material for covering a whole outer peripheral surface of the dielectric tube, is provided at a portion of the gap facing at least one of the tube sheets, a width of the at least one discharging suppressing member being substantially the same as the at least one tube sheet which it faces, and the at least one discharging suppressing member is connected to a conductive lead so as to electrically connect to the metal tube or one of the tube sheets and no electric field is generated at the portion of the gap facing the at least one tube sheet.

2. The ozone generating apparatus as claimed in claim 1, wherein the thin metal material is thin metal plate.

3. The ozone generating apparatus as claimed in claim 1, wherein the thin metal material is thin metal film.

* * * * *